United States Patent [19]

Sakamoto et al.

[11] Patent Number: 4,812,960

[45] Date of Patent: Mar. 14, 1989

[54] POWER FEEDING APPARATUS

[75] Inventors: Kazuho Sakamoto, Kyoto; Takao Shitaya; Shigeru Kusunoki, both of Yamatokoriyama; Naoyoshi Maehara, Nara; Takashi Niwa, Nara; Takahiro Matsumoto, Nara; Daisuke Bessyo, Yamatokoriyama, all of Japan

[73] Assignee: Matsushita Electric Industrial Co., Ltd., Kadoma, Japan

[21] Appl. No.: 131,717

[22] Filed: Dec. 11, 1987

[30] Foreign Application Priority Data

| | | | |
|---|---|---|---|
| Dec. 15, 1986 | [JP] | Japan | 61-298144 |
| Dec. 15, 1986 | [JP] | Japan | 61-298145 |
| Dec. 15, 1986 | [JP] | Japan | 61-298146 |

[51] Int. Cl.[4] .......... H02M 3/335

[52] U.S. Cl. .......... 363/20; 363/40; 363/97; 363/131; 219/10.55 B

[58] Field of Search .......... 363/18–21, 363/39, 40, 75, 97, 131; 219/10.55 B

[56] References Cited

U.S. PATENT DOCUMENTS

| | | | |
|---|---|---|---|
| 3,319,149 | 5/1967 | Start | 363/40 |
| 3,828,239 | 8/1974 | Nagai et al. | 363/20 |
| 4,027,200 | 5/1977 | Sahara et al. | 363/20 |
| 4,616,300 | 10/1986 | Santelmann, Jr. | 363/21 |
| 4,709,316 | 11/1987 | Ngo et al. | 363/21 |

*Primary Examiner*—Peter S. Wong
*Attorney, Agent, or Firm*—Wenderoth, Lind & Ponack

[57] ABSTRACT

A power feeding apparatus which is used in a high-frequency heater or the like, is further power-converted by a transformer after the power provided by the power supply such as commercial power supply or the like has been converted into the high-frequency power by a transducer including a semiconductor, feeds the converted power into the load having the unidirectional electrical current characteristics of magnetron or the like. The generating voltage is dropped so that the stable power may be fed without the corona discharge and the acr discharge to be caused, the insulating withstand voltage between the windings of the transformer, the pulling of the wirings, and the insulating withstand voltage may be reduced.

7 Claims, 8 Drawing Sheets

POWER FEEDING APPARATUS

BACKGROUND OF THE INVENTION

The present invention generally relates to a power feeding apparatus which is used in a high-frequency heater or the like, is further power-converted by a transformer after the power provided by a power supply such as a commercial power supply or the like has been converted into the high-frequency power by a transducer including a semiconductor, and feeds the converted power into the load having the unidirectional electrical current characteristics of a magnetron or the like.

Generally, such a power feeding apparatus is provided in various constructions with the views of smaller size, lighter weight, lower cost, etc. of chiefly the apparatus transformer. A magnetron is a representation in the example of the load having unidirectional electrical current characteristics and requiring comparatively large power. Many improvements are provided, even with respect to such a magnetron and the propositions thereof are provided.

FIG. 1 shows one embodiment of the conventional power feeding apparatus of this type. It is the same in construction as that shown in Japanese Patent Application Publication (unexamined) Tokkaisho No. 259388/1986.

With the construction of FIG. 4, operate a transistor 6 with the frequency of approximately 20 KHz through 100 KHz, and the weight and size of the boosting transformer may be made from one severalth to one tenoddth as compared with the boosting with the commercial power-supply frequency being as it is.

The power of a commercial power supply 9 is rectified by a diode bridge 10 to form a unilateral power supply. The commercial power supply 9 and a DC power supply circuit 13 form the power supply of an inverter 14. It is to be noted that a choke coil 11 and a smoothing capacitor 12 play the role of a filter with respect to the high-frequency switching operation of the inverter 14.

The inverter 14 is composed of a resonance capacitor 5, a transformer 2, the transistor 6, a diode 7 and a driving circuit 8. The transistor 6 effects the switching operation with the given period and duty (on, off time ratio) by the base current to be fed from the driving circuit 8. As a result, a current with such a collector current $I_{CE}$ and a diode Id as shown in FIG. 5(*a*) as a center flows to the primary winding of the transformer 2. Such a current $I_L$ as shown in FIG. 5(*b*) flows.

A load 3 having a unidirectional electrical current characteristic is connected onto the secondary side of the transformer 2. The power converted by the inverter 4 is to be fed to the load 3. The load 3 is equivalently one like a magnetron represented by a series connector of a diode $D_M$, a resistor $R_M$, and a zener diode $Z_{DM}$.

Such a current $I_A$ as shown in FIG. 2(*b*) flows to the load 3. The voltage $V_{AK}$ of the load 3 becomes as shown in FIG. 2(*a*). This is because the transformer 2 is a leakage type transformer, further a capacitor CH4 which a reverse bias current bypass means is connected in parallel relation to the load. Namely, the load 3 may be replaced by a series circuit of a resistor $R_M$, a diode $D_M$, and a zener diode $Z_{DM}$. The capacitor CH is connected in parallel to it.

The load 3 is non-linear. The impedance (almost open) becomes very large through the diode $D_M$ with respect to the reverse voltage (normal-direction voltage). On the other hand, the impedance becomes large before a certain constant voltage (zener voltage of $Z_{DM}$) is exceeded with respect to the positive voltage (negative direction voltage). The impedance becomes small when this voltage is exceeded. The magnetron is such a load as described hereinabove. The characteristics are shown in FIG. 3.

In FIG. 2(*a*), the load conducts when the voltage $V_{AK}$ of the load 3 is −4 KV. If the voltage on the primary side rises because of the low impedance, approximately −4 KV is retained. Also, at this time, the load current IA flows.

When the reverse voltage is applied, the load becomes very high in impedance. Thus, such a voltage as shown in FIG. 2(*a*) is caused through the connection with the capacitor CH4 for the bypass use of the reverse bias. The voltage is approximately 10 KV. It may be somewhat smaller by the larger capacitor CH4. The charging current into the capacitor CH4 increases correspondingly. The copper loss caused in the winding of the transformer becomes large, with the temperature rise is caused through the heating. In approximately optimum capacitor capacity, the reverse voltage becomes approximately 10 KV.

In such a power feeding apparatus, the voltage $V_{AK}$ of approximately 10 KV is applied, so that the insulation failure of the corona discharge, the arc discharge or the like is caused from between both the terminals of the load 3 to destroy the apparatus. As this voltage is made smaller, it is lowered somewhat by the larger size of the capacitor CH4 for bypass use of the reverse bias. The charging current of the capacitor becomes larger correspondingly. The copper loss of the transformer 2 increases to perform the heating operation so that the transformer fails because of the insulating destruction. It is very difficult to prevent the corona discharge or the arc discharge through the lowered voltage $V_{AK}$ like this.

SUMMARY OF THE INVENTION

Accordingly, an essential object of the present invention is to control the increase in the upper loss of the transformer to lower the application voltage in the reverse direction so that the apparatus may not be prevented from failing through the corona discharge or the arc discharge.

In accomplishing the above described object, the power feeding apparatus of the present invention comprises a power supply such as a commercial power supply or the like, a semiconductor switch, a power transducer which has the driving means to cause the high-frequency power, a load having the unidirectional electrical current characteristics, a transformer which feeds to this load the power converted in advance, and a tuning circuit means which has the resonance frequency higher than the operating frequency of the power transducer to tune the power transducer.

Meanwhile, the tuning circuit means is adapted to make the resonance frequency almost the same as the higher harmonic of the operating frequency.

Furthermore, the tuning circuit means additionally connects the winding with the transformer so as to connect the capacitor as the load of this winding. The winding connected with the load at this time is respectively connected in one terminal with the winding of the tuning circuit so that the polarity of the voltage to be caused in the other terminal of each winding may be made the same

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE INVENTION

Figure 1:
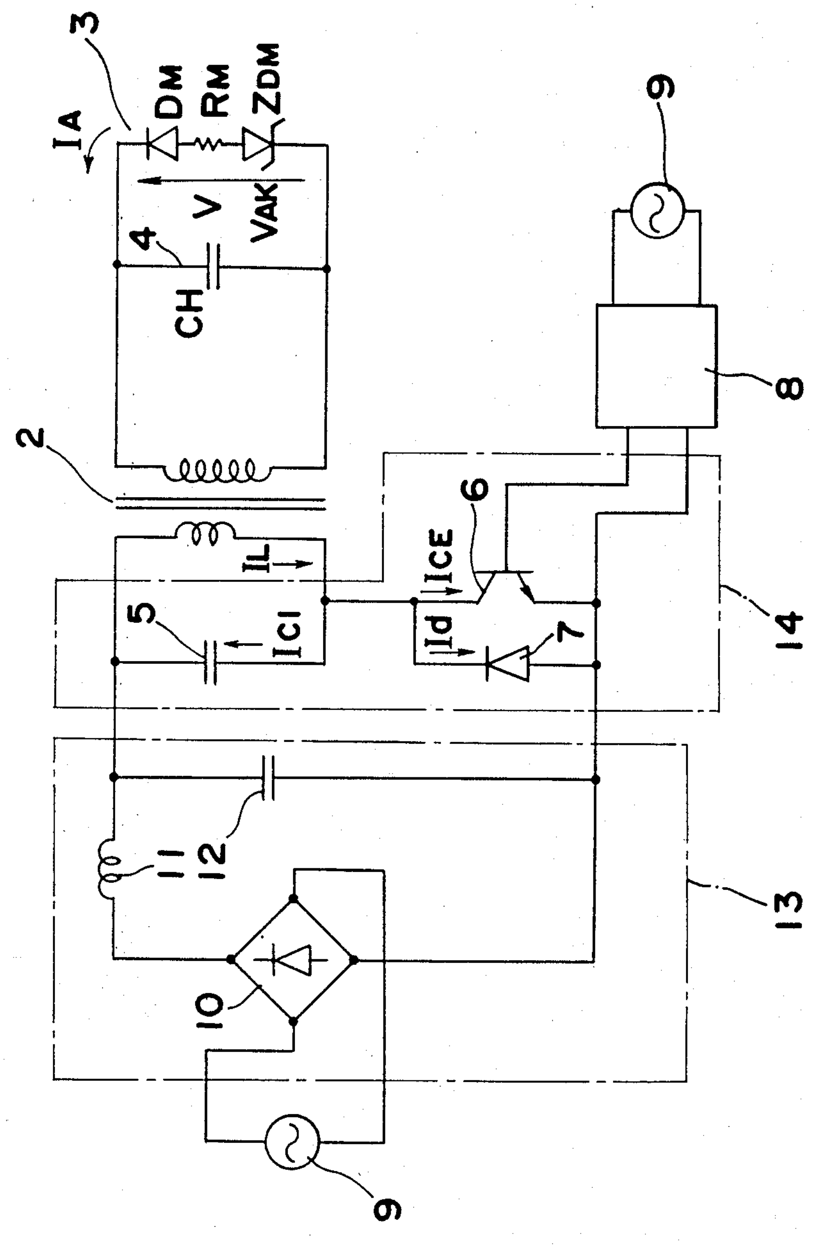
Fig. 1 PRIOR ART
FIG. 1 is a circuit diagram of the conventional power feeding apparatus (already referred to)
Figure 2:
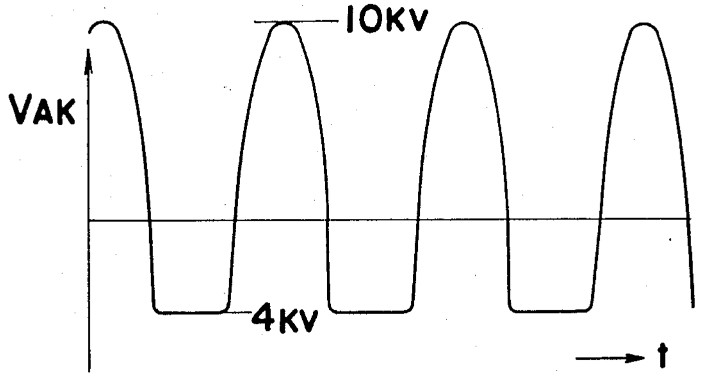
FIGS. 2*a* and 2*b* shows waveform charts of the circuit of FIG. 1.
Figure 2:
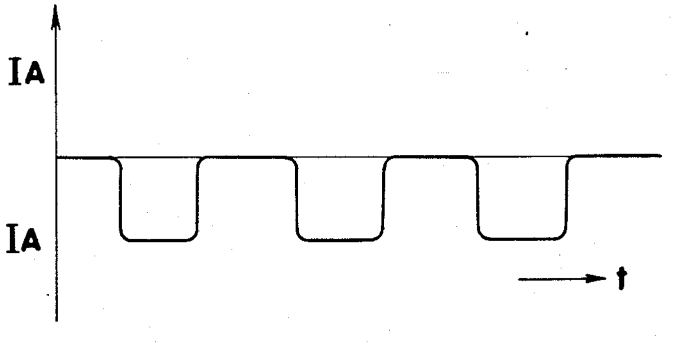
Figure 3:
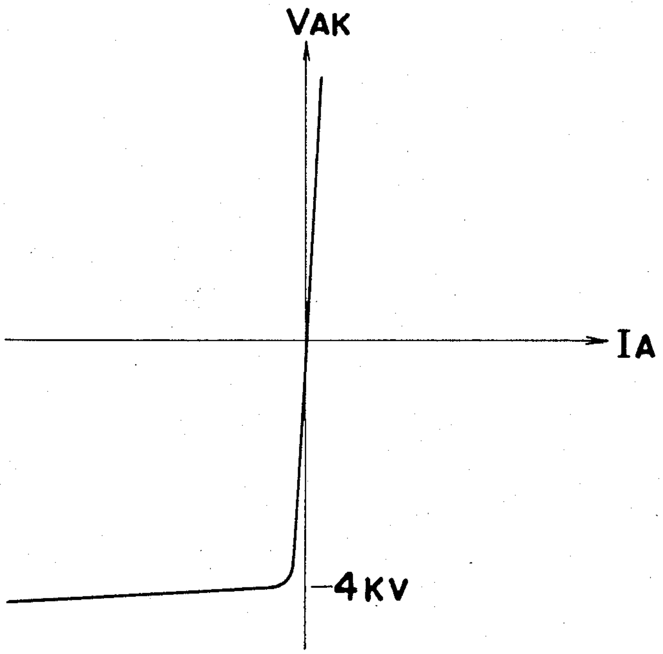
FIG. 3 is an operation characteristic graph of a magnetron.

Before the description of the present invention proceeds, it is to be noted that like parts are designated by like reference numerals throughout the accompanying drawings.

Figure 4:
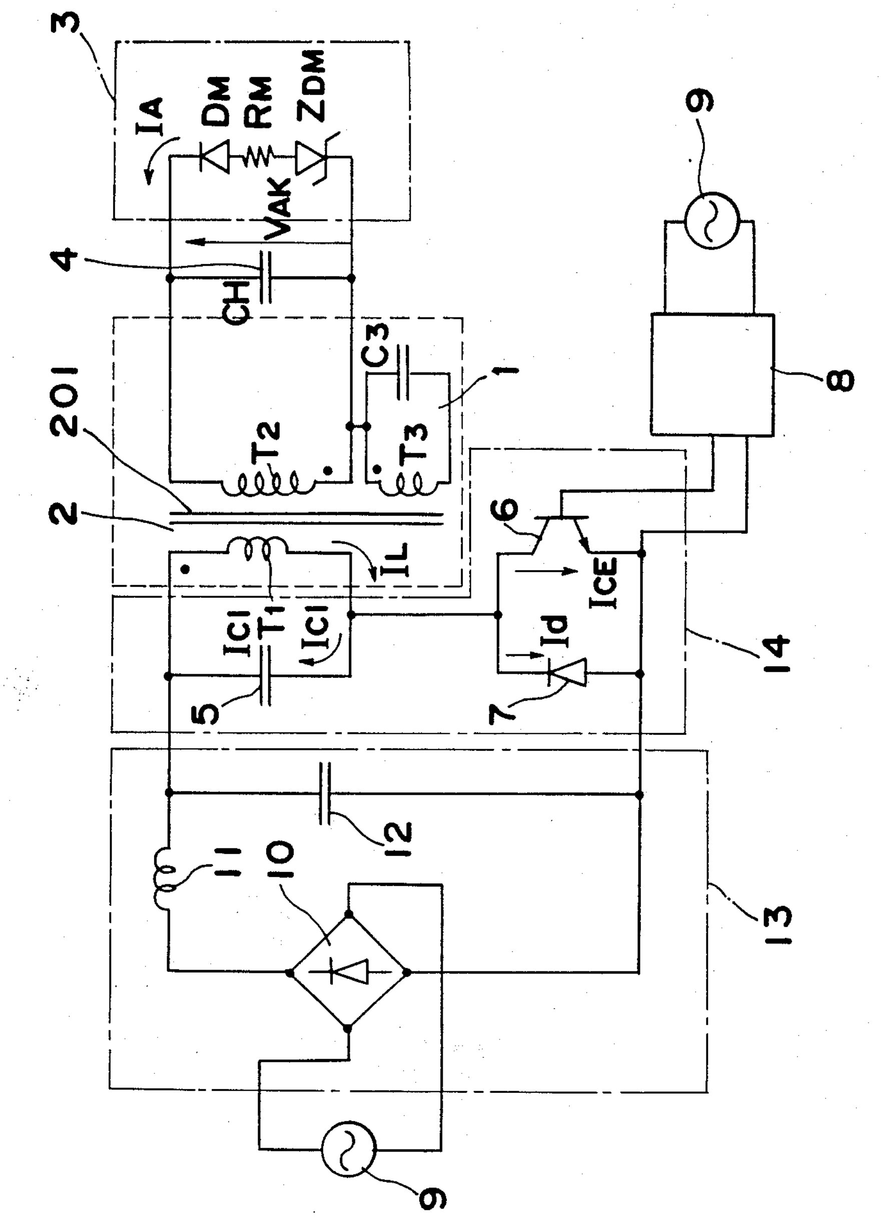
FIG. 4 is a diagram of a power feeding apparatus in one embodiment of the present invention.

As shown in FIG. 4, a commercial power supply 9 is fed into a DC power circuit 13. It is supplied into an inverter 14 which is a power transducer. The commercial power supply 9 and the DC power supply 13 form the power supply of the inverter 14. The inverter 14 is composed of a semiconductor switch (transistor) 6, a diode 7, etc. It feeds power which has been converted into a load 3 having unidirectional electrical current characteristics through the urging of a transformer 2. The load 3 is that like a magnetron, which is equivalently represented by a series connector of a diode $D_M$, a resistor $R_M$, and a zener diode $Z_{DM}$.

Figure 5:
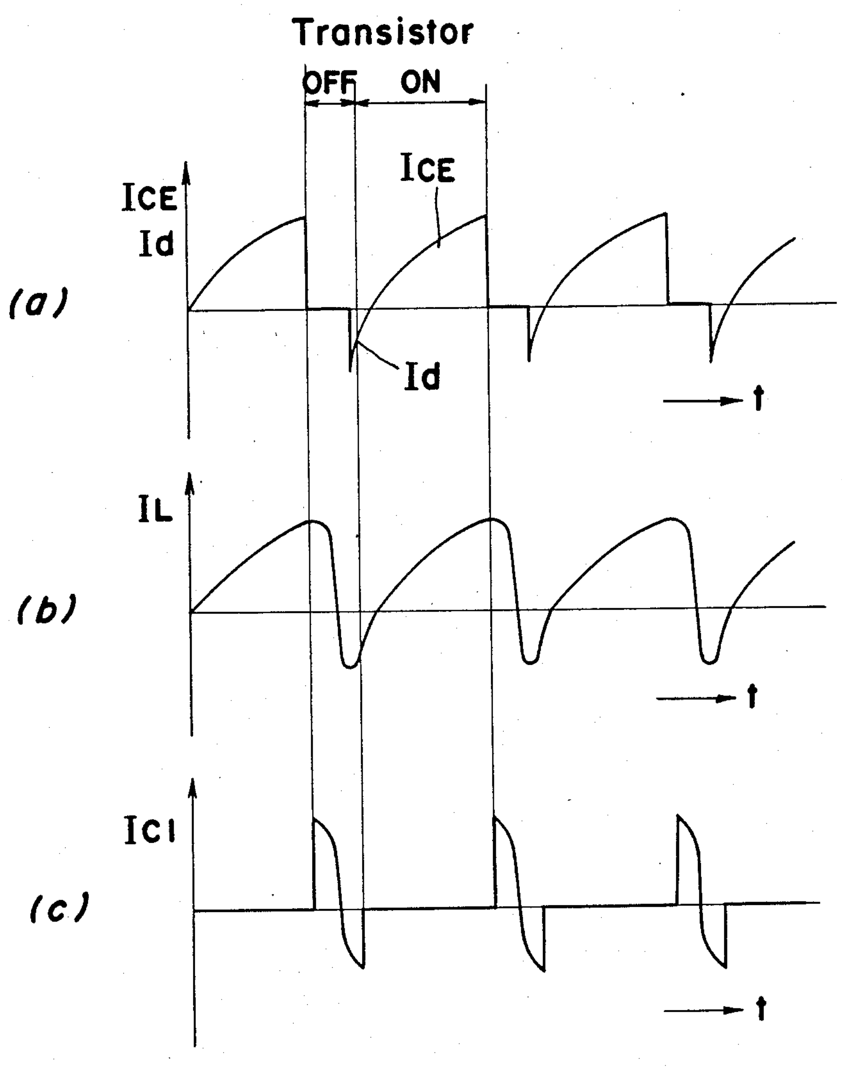
FIGS. 5 and 6 show the operation waveforms of the circuit of FIG. 4.

A current flowing through a transistor 6, a diode 7, the primary winding of the transformer 2, a resonance capacitor 5 respectively are provided as shown in FIGS. 5(*a*), 5(*b*) and 5(*c*). Namely, the current $I_{CE}$ of the transistor 6, the current of the diode 7 flow as in FIG. 5(*a*). And such high-frequency current $I_L$ as that in FIG. 5(*b*) flows to the primary winding of the transformer 2. Such current $I_{CI}$ as that in FIG. 5(*c*) flows to the resonance capacitor 5. These waveforms flow by the on, off of the transistor 6.

Namely, with the transistor 6 off (as shown in FIG. 5(*a*)), a current which is almost the same as $I_{CE}$ flows onto the primary side of the transformer 2 to turn off the transistor 6 after the lapse of the on time by the predetermined time. At this time, the current flowing onto the primary winding T1 of the transformer 2 oscillates between the inductance component of the transformer 2 and the capacitor 5 for resonance use to flow such oscillation currents as shown in FIGS. 5(*b*) and 5(*c*) when the transistor 6 is off. After the lapse of the off time which is about one-half cycle through one cycle of the oscillation period, the transistor 6 is turned on again.

The current flows into the inductance component of the primary winding T1 of the transformer 2 again and such currents as shown in FIG. 5(*a*) and 5(*b*) flow. By the repetition of the above-described operation, the oscillation continues, it is converted into the high-frequency power.

Figure 6:
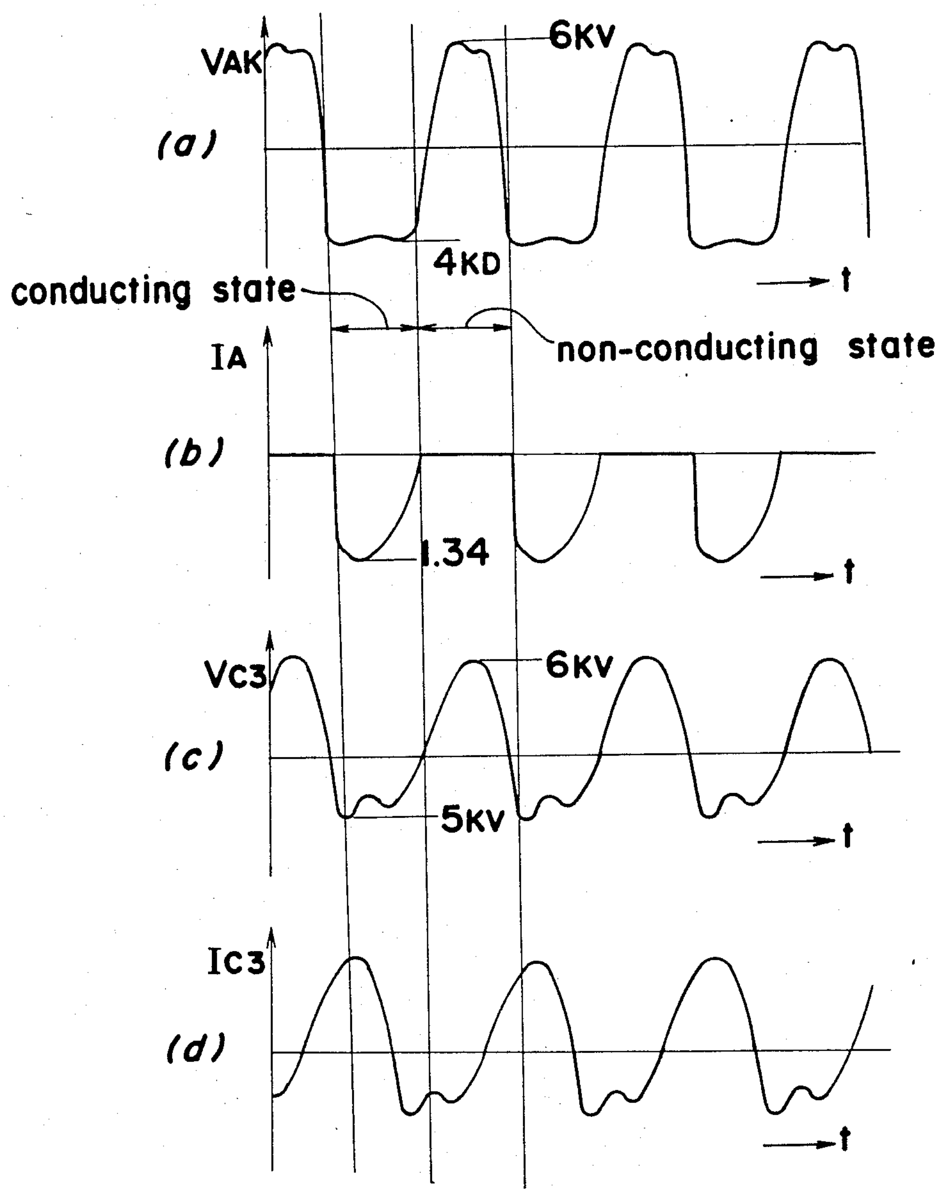

On the other hand, the wave form of each operating voltage, current on the secondary side of the transformer 2 is shown in FIG. 6. The voltage $V_{AK}$ of the load 3 is shown in FIG. 6(*a*) and the current $I_A$ thereof is shown in FIG. 6(*b*). When the voltage has been caused in the transformer 2 in the direction along which the load conducts, the load conducts to flow the current $I_A$ as it exceeds the voltage equivalent to the zener voltage of the load 3. The voltage $V_{AK}$ is retained at the approximate zener voltage. Generally, the voltage becomes approximately −4 KV in the case of a magnetron.

When the voltage has been caused in the transformer 2 in the non-conductive condition of the load 3, the current $I_A$ of the load 3 does not flow, but flows through the capacitor CH4 for bypass use of the non-bias. The voltage $V_{AK}$ at this time causes approximately −6 KV. In the conventional power feeding apparatus, it is about −6 KV. This may be realized by the provision of a tuning circuit means 1 shown in FIG. 4. The tuning circuit means 1 is made a constant which has resonance in the frequency higher than the operating frequency of the inverter 14. It is most effective that the resonance frequency is made the high frequency of the operating frequency of the inverter 14. In the fourth embodiment, the winding T3 is added to the transformer 2 to connect the capacitor C3 to the added winding T3 so that the resonance frequencies at the operating condition of this T3 and C3 become the higher harmonics of the operating frequency of the inverter 14. The tuning circuit means 1 is magnetically coupled through an iron core onto the secondary side of the transformer 2.

Figure 7:
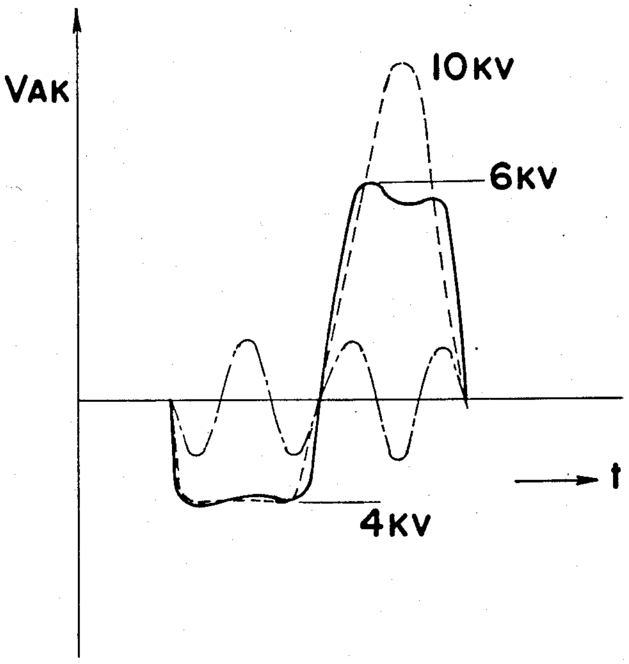
Fig. 7 shows a waveform chart for explaining the essential portions of the circuit of FIG. 4.

The reason why the voltage $V_{AK}$ drops into 6 KV under the above-described construction will be described in FIG. 7. The dotted line of FIG. 7 shows the voltage waveform where the conventional tuning circuit means 1 does not exist, with about 10 KV being caused. In FIG. 7, the solid line shows the voltage waveform where the tuning circuit means 1 of the present invention is added. The resonance frequency of the tuning circuit means 1 in this case shows the case where it has been set in the third higher harmonic of the operating frequency of the inverter 14. Accordingly, the frequency (shown in one-dot chain line) of the third higher harmonic of the tuning circuit means 1 is overlapped on the voltage waveform (shown in the dotted line) in which the conventional 10 KV was caused, so that the waveform becomes that of the low voltage shown in the solid line.

Figure 8A:
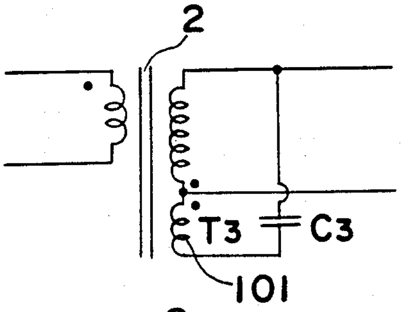
FIG. 8*a* through FIG. 9*b* are circuit diagrams showing the other embodiment of the tuning circuit means in the same circuit diagram of FIG. 4.
Figure 8B:
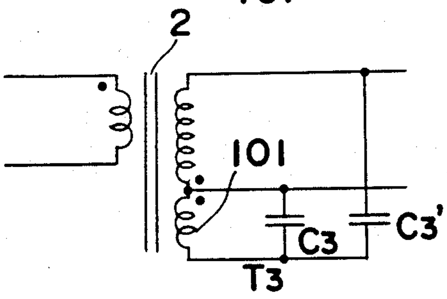
Figure 8C:
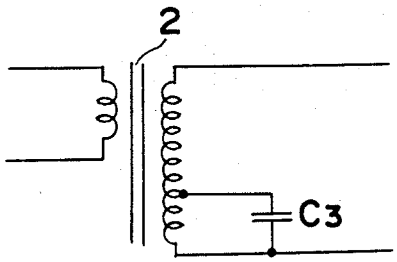
Figure 9A:
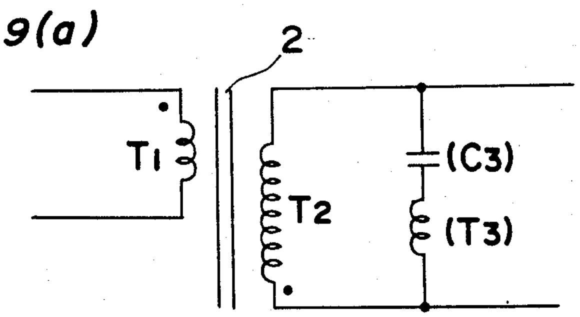
Figure 9B:
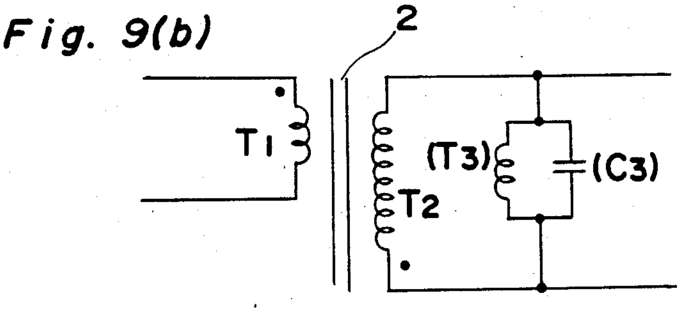

The operation and effect by the tuning means 1 are provided as described hereinabove. The realizing method may be provided in addition to the tuning circuit means shown in FIG. 4. The other embodiment of the portion surrounded by the dotted line including the tuning circuit means 1 and the transformer 2 shown in FIG. 4 is shown in FIGS. 8(*a*), 8(*b*) and 8(*c*), and FIGS. 9(*a*) and 9*b*). In FIGS. 8(*a*) and 8(*b*), the winding is added to the transformer 2, with the capacitor being connected to the winding. In FIG. 8(*c*), an intermediate tap is provided on the secondary winding of the transformer 2, with the capacitor being connected to the intermediate tap. In FIGS. 9(*a*) and 8(*b*), the L and C are provided newly, and are connected to the load circuit.

Such a voltage $V_{C3}$ shown in FIG. 6(*c*) is caused in the tuning circuit means 1 shown in FIG. 4 to flow such a current $I_{C3}$ as shown in FIG. 6(*d*). In the waveform, the frequency, which is three times as many as the operating frequency of the inverter 14, and the load voltage are overlapped. The winding of the transformer 2 shown in FIG. 4 is constructed as the polarity of the voltage $V_{C3}$ may become the same as that of the voltage $V_{AK}$ of the load. Namely, the winding T2 connected to the load is connected in the respective one terminal with the winding T3 of the tuning circuit means 1 so that the polarity of the generated voltage at the other terminal of each winding may become the same. In this manner, the voltage difference between the windings T2 and T3 becomes smaller so that the withstand voltage between the windings T2 and T3 may be made smaller. The reason therefor will be described in FIG. 10 in accordance with the construction of the windings of the transformer.

Figure 10:
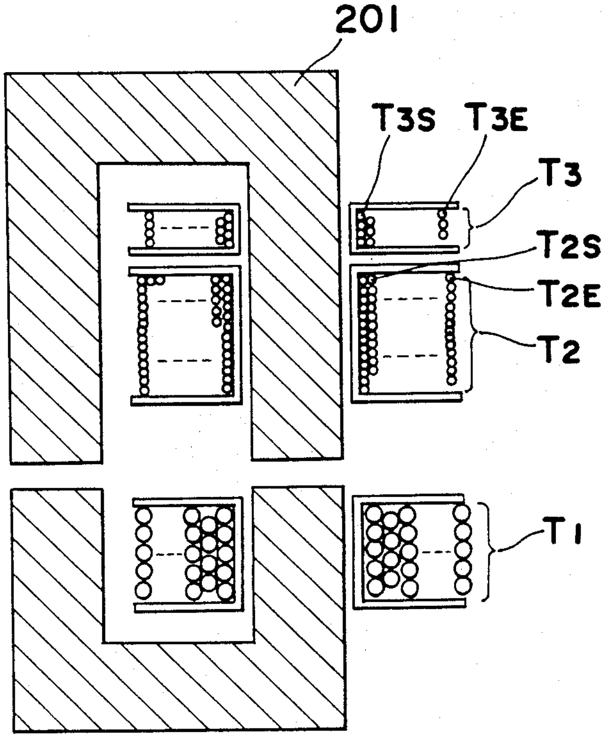
FIGS. 10 and 11 are cross-sectional view of the transformer for constructing the tuning circuit means of the circuit diagram of FIG. 4.

A core 201, a primary winding T1, a winding for load use T2, and a winding for tuning circuit T3 are shown in FIG. 10. The T2S portion and the T3S portion, which are closer to the respective centers of the T2 and T3, are connected with each other. The winding directions are constructed so that the polarities of the generated voltages of the terminals T2E and T3E on the outer side may become the same. In this manner, the voltage difference between the windings T2 and T3 becomes smaller, neither corona discharges nor arc discharges are provided between the windings, the smaller withstand voltage of the windings T2 and T3 will do, the space distance may be made smaller also, thus resulting in a smaller transformer. If the polarity is reverse, large voltage is caused between the T2E and the T3E to cause the corona discharge and the arc discharge for damages.

Figure 11:
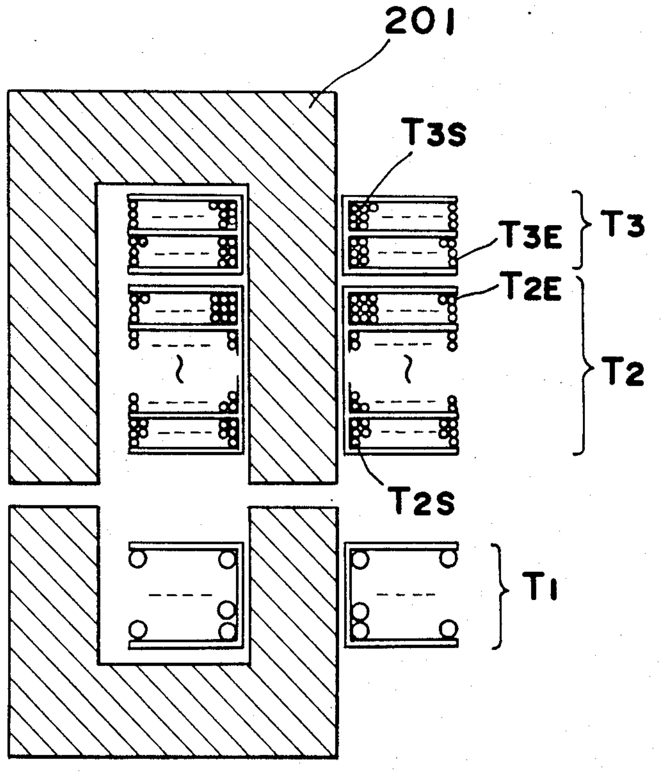

FIG. 11 shows a construction view in a case where the winding T2 for load use and the tuning circuit winding T3 are split-wound. Even in this case, the T2S is connected with the T3S. As the voltage of the same polarity is caused in the T2E and the T3E, the voltage difference between the T2E and the T3E is small, so that there is no possibility of the corona discharge and the arc discharge. The distance between the T2E and the T3E may be also made small, with the result that small-sized transformer made be made smaller. If the polarity is reverse, large voltage is caused between the T2E and the T3E to fail the transformer by the corona discharge and the arc discharge.

The reverse voltage of the load 3 may be lowered by the provision of the tuning circuit means 1. Thus, there is no possibility of corona discharge, arc discharge to be caused, so that the stable operation is provided. The insulation of wirings, electrodes, terminals, etc. is not required to be strengthened, so that the realization is easier and the cost is lower.

As is clear from the foregoing description, according to the arrangement of the present invention, the generating voltage is dropped so that the stable power may be fed without the corona discharge and the arc discharge to be caused, the insulating withstand voltage between the windings of the transformer, the pulling of the wirings, and the insulating withstand voltage may be reduced.

Furthermore, the distance between the windings of the transformer may be made smaller so that the transformer may be made smaller in size. As the insulating yield strength is smaller and the size is smaller, the lower cost may be realized.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A power feeding apparatus for receiving power from a power source and comprising: at least one semiconductor switch; a power transducer having a driving means for generating a high-frequency power of a preselected frequency; a load consisting of a magnetron which has unidirectional electrical current characteristics; a transformer which feeds said high frequency power from said power transducer to said load, and a tuning circuit means which has a resonant frequency which is the third higher harmonic of said preselected frequency of said power transducer, said tuning circuit means being connected to said power transducer.

2. A power feeding apparatus in accordance with claim 1, wherein a transformer winding of a tuning circuit means and a transformer winding to be connected to load are provided to be the same in polarity an position of the voltages generated between the transformer windings.

3. A power feeding apparatus in accordance with claim 1, wherein said tuning circuit means is adapted to be connected by magnetic coupling to said transformer and connected onto the load side of said transformer.

4. A power feeding apparatus in accordance with claim 1, wherein said tuning circuit means is adapted to be connected by a winding of said transformer.

5. A power feeding apparatus in accordance with claim 4, wherein said tuning circuit means is adapted to have a capacitive load connected to said winding of said transformer.

6. A power feeding apparatus in accordance with claim 1, wherein said tuning circuit means is connected by windings in said transformer one terminal of a winding of said tuning circuit means being connected to one terminal of a winding connected to said load, the respective generating voltages of the other terminal of said winding of said tuning circuit means and of the other terminal of said winding connected to said load being adapted to be of the same priority.

7. A power feeding apparatus in accordance with claim 6, wherein a capacitive load is adapted to be connected as a load of said winding of said tuning circuit means.

* * * * *